US012670299B2

(12) United States Patent
Fujisawa et al.

(10) Patent No.: US 12,670,299 B2
(45) Date of Patent: Jun. 30, 2026

(54) WIRE HARNESS DESIGNING METHOD AND DESIGN SUPPORT DEVICE

(71) Applicant: Yazaki Corporation, Tokyo (JP)

(72) Inventors: Takanori Fujisawa, Makinohara (JP); Tetsuya Onoda, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 1276 days.

(21) Appl. No.: 17/516,863

(22) Filed: Nov. 2, 2021

(65) Prior Publication Data

US 2022/0138370 A1 May 5, 2022

(30) Foreign Application Priority Data

Nov. 4, 2020 (JP) ................................. 2020-184390

(51) Int. Cl.
*G06F 30/18* (2020.01)
*G06F 113/16* (2020.01)
*G06F 119/18* (2020.01)

(52) U.S. Cl.
CPC .......... *G06F 30/18* (2020.01); *G06F 2113/16* (2020.01); *G06F 2119/18* (2020.01)

(58) Field of Classification Search
None
See application file for complete search history.

(56) References Cited

U.S. PATENT DOCUMENTS

| | | | |
|---|---|---|---|
| 5,610,454 A | 3/1997 | Nishikawa et al. | |
| 7,107,197 B1 | 9/2006 | Shropshire | |
| 10,438,151 B2 * | 10/2019 | Bold ................ | G06Q 10/06315 |
| 2012/0005344 A1 * | 1/2012 | Kolin ................. | H05K 7/20836 |
| | | | 715/733 |

FOREIGN PATENT DOCUMENTS

| | | | | |
|---|---|---|---|---|
| EP | 3522047 A2 * | 8/2019 | ............. | G06F 30/18 |
| JP | 2001229188 A * | 8/2001 | | |
| JP | 2017-152154 A | 8/2017 | | |
| JP | 2017152112 A | 8/2017 | | |

* cited by examiner

*Primary Examiner* — Rehana Perveen
(74) *Attorney, Agent, or Firm* — Sughrue Mion, PLLC

(57) ABSTRACT

A wire harness designing method includes, extracting, as a primary common component, a component commonly provided in the wire harnesses of all the product numbers, and determining a configuration of a basic part; classifying, as an optional component, the rest of the primary common component among all the components that form the wire harnesses of all the product numbers; extracting, as a secondary common component, component groups commonly provided in product numbers among the optional components of which the usage rate is equal to or higher than a predetermined value, and determining a configuration of an additional part; classifying, as an additional component, each component of the rest of secondary common components among the optional components; and forming the whole wire harness of each product number with a combination of the wire harness of the basic part, the wire harness of the additional part, and the additional component.

5 Claims, 6 Drawing Sheets

FIG. 2

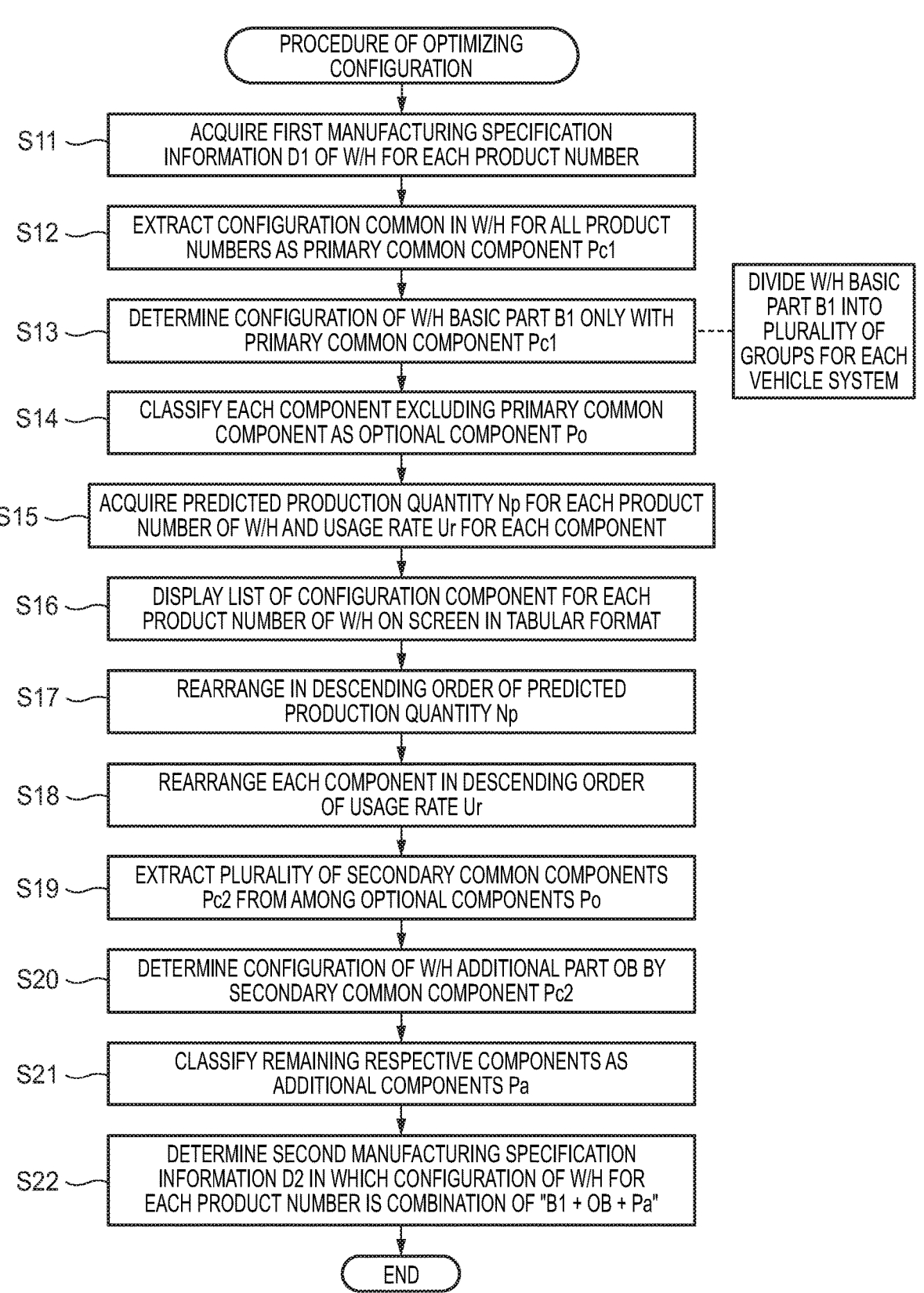

PROCEDURE OF OPTIMIZING CONFIGURATION

S11 — ACQUIRE FIRST MANUFACTURING SPECIFICATION INFORMATION D1 OF W/H FOR EACH PRODUCT NUMBER

S12 — EXTRACT CONFIGURATION COMMON IN W/H FOR ALL PRODUCT NUMBERS AS PRIMARY COMMON COMPONENT Pc1

S13 — DETERMINE CONFIGURATION OF W/H BASIC PART B1 ONLY WITH PRIMARY COMMON COMPONENT Pc1

DIVIDE W/H BASIC PART B1 INTO PLURALITY OF GROUPS FOR EACH VEHICLE SYSTEM

S14 — CLASSIFY EACH COMPONENT EXCLUDING PRIMARY COMMON COMPONENT AS OPTIONAL COMPONENT Po

S15 — ACQUIRE PREDICTED PRODUCTION QUANTITY Np FOR EACH PRODUCT NUMBER OF W/H AND USAGE RATE Ur FOR EACH COMPONENT

S16 — DISPLAY LIST OF CONFIGURATION COMPONENT FOR EACH PRODUCT NUMBER OF W/H ON SCREEN IN TABULAR FORMAT

S17 — REARRANGE IN DESCENDING ORDER OF PREDICTED PRODUCTION QUANTITY Np

S18 — REARRANGE EACH COMPONENT IN DESCENDING ORDER OF USAGE RATE Ur

S19 — EXTRACT PLURALITY OF SECONDARY COMMON COMPONENTS Pc2 FROM AMONG OPTIONAL COMPONENTS Po

S20 — DETERMINE CONFIGURATION OF W/H ADDITIONAL PART OB BY SECONDARY COMMON COMPONENT Pc2

S21 — CLASSIFY REMAINING RESPECTIVE COMPONENTS AS ADDITIONAL COMPONENTS Pa

S22 — DETERMINE SECOND MANUFACTURING SPECIFICATION INFORMATION D2 IN WHICH CONFIGURATION OF W/H FOR EACH PRODUCT NUMBER IS COMBINATION OF "B1 + OB + Pa"

END

*FIG. 3*

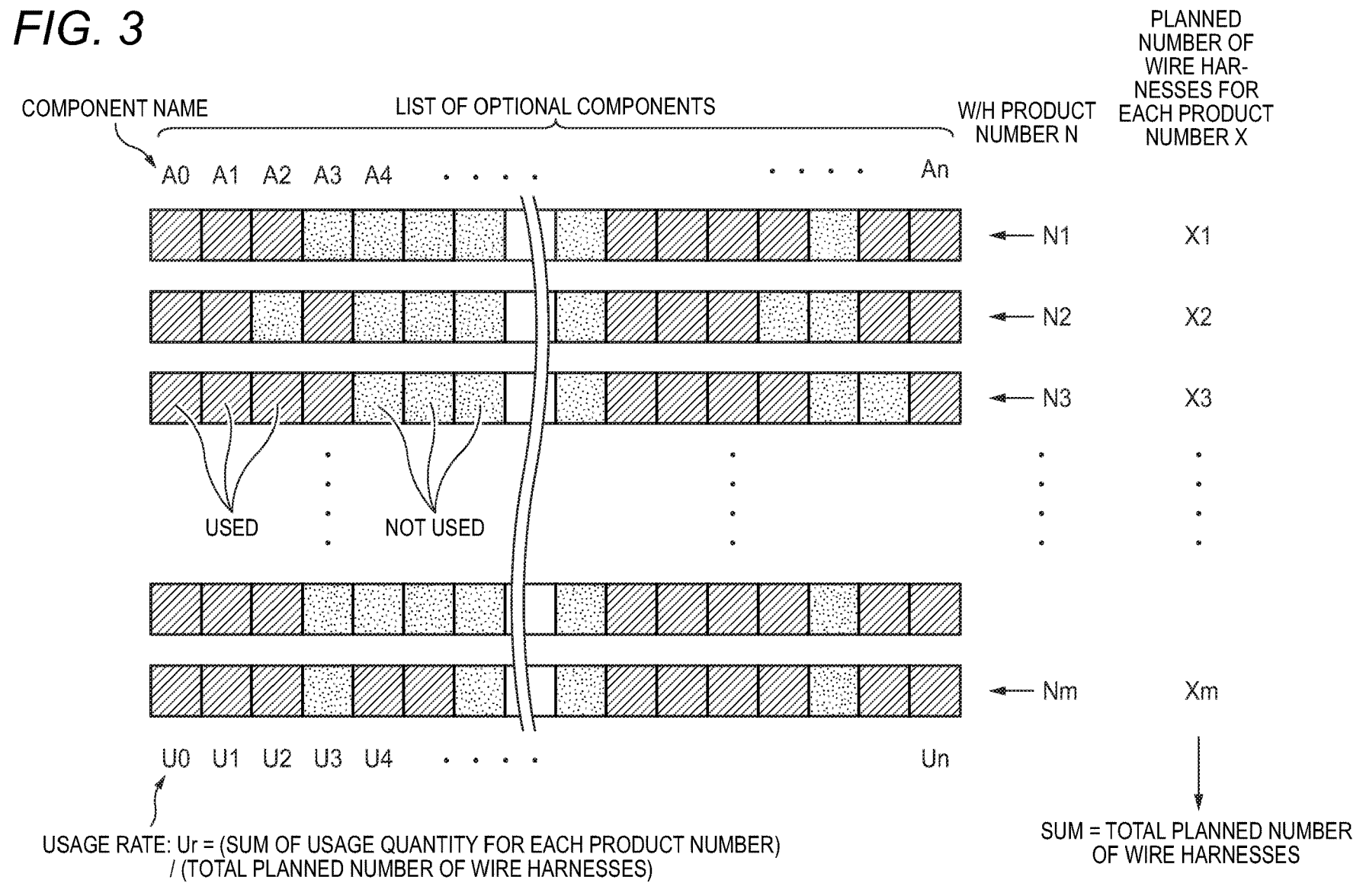

PLANNED NUMBER OF WIRE HARNESSES FOR EACH PRODUCT NUMBER X

X1
X2
X3
· · · · ·
Xm →

SUM = TOTAL PLANNED NUMBER OF WIRE HARNESSES

W/H PRODUCT NUMBER N

N1 ↓
N2 ↓
N3 ↓
· · · · ·
Nm ↓

LIST OF OPTIONAL COMPONENTS

An
Un

COMPONENT NAME

A0 A1 A2 A3 A4 · · · · ·

NOT USED

USED

U0 U1 U2 U3 U4 · · · · ·

USAGE RATE: $Ur$ = (SUM OF USAGE QUANTITY FOR EACH PRODUCT NUMBER) / (TOTAL PLANNED NUMBER OF WIRE HARNESSES)

FIG. 6

| PRODUCT NUMBER | A | B | C | D | E | F | add NUMBER OF ADDITIONAL COMPONENTS (Pa) | TOTAL (NT) |
|---|---|---|---|---|---|---|---|---|
| KB111 | ● | | | | | | 10 | 11 |
| KD912 | | ● | | | | | 15 | 16 |
| HZ423 | | ● | ● | | | | 11 | 13 |
| HY914 | ● | | | | | | 10 | 11 |
| KK315 | ● | | | | | | 12 | 13 |
| KB316 | | | ● | | | | 18 | 19 |
| KE717 | | | ● | | | | 10 | 11 |
| HP718 | | ● | | | | | 16 | 17 |
| HZ619 | ● | | | | | | 12 | 13 |
| KK010 | | | ● | | | | 19 | 20 |
| KE011 | | | | ● | ● | | 18 | 20 |
| KE512 | | | | ● | | | 7 | 8 |
| KK513 | | | | ● | | | 5 | 6 |
| KM414 | | | | ● | | | 4 | 5 |
| KD815 | | | | ● | | | 8 | 9 |
| KE816 | | | | | | ● | 17 | 18 |
| KK217 | | | | | | ● | 16 | 17 |
| KD018 | | | | ● | | | 19 | 20 |
| KN119 | | | | | ● | ● | 13 | 15 |
| KD310 | | | | | ● | ● | 11 | 13 |
| KD411 | | | | | ● | ● | 10 | 12 |
| KN212 | | | | | ● | ● | 12 | 14 |
| KN313 | | | | | | ● | 13 | 14 |
| KE314 | | | | | | ● | 10 | 11 |
| KE615 | | | | | | | 15 | 15 |
| KK616 | | | | ● | | | 23 | 24 |

OB (spans columns A–F)

WIRE HARNESS DESIGNING METHOD AND DESIGN SUPPORT DEVICE

CROSS REFERENCE TO RELATED APPLICATIONS

This application is based on and claims priority from Japanese patent application No. 2020-184390 filed on Nov. 4, 2020, the entire contents of which are incorporated herein by reference.

TECHNICAL FIELD

The present invention relates to a wire harness designing method and a design support device that can be used to manufacture a wire harness which is a vehicle component.

BACKGROUND ART

Generally, a wire harness mounted on a vehicle such as an automobile or the like is an assembly of electric wires integrally formed by bundling a large number of various types of electric wires, and has a complicated shape. The wire harness is used to connect a power source such as an in-vehicle battery or the like to various electrical components on the vehicle, or to connect a plurality of electrical components to each other. The wire harness includes a large number of connectors in order to facilitate attachment and detachment of an electric wire connection portion.

For example, JP-A-2017-152154 discloses a wire harness manufacturing method and a wire harness manufacturing device for reducing an increase in manufacturing cost when a wire harness having various configurations is manufactured according to various required specifications. Specifically, when forming a wire harness obtained by combining a base harness having basic specifications with one or more optional harnesses that can be selected, specifications of the base harness and specifications of the optional harness are specified according to order information. A configuration of a common circuit in the specifications of the optional harness is extracted, the extracted common circuit is incorporated into the specifications of the base harness, and the configuration of the common circuit is deleted from the specifications of the optional harness, thereby manufacturing a plurality of intermediate structures based on data obtained by rearranging the common circuit, and manufacturing the wire harness by combining the plurality of intermediate structures.

Meanwhile, based on requirements such as specifications, a quantity, a delivery date, or the like that a vehicle manufacturer, who is a customer, determines each time, a component manufacturer manufacturing a wire harness for a vehicle manufactures a completed product of the wire harness that meets the requirements by the delivery date, and delivers the completed product thereof to the customer by the designated delivery date. Since there are various types, grades, destinations, or the like of the vehicle mounting the wire harnesses, the component manufacturer respectively manufactures various types of wire harnesses, which are respectively managed by different product numbers, according to the requirements of the vehicle manufacturer or the like.

On the other hand, in consideration of human resources, securing various manufacturing facilities, manufacturing costs, or the like related to the manufacturing of the wire harness, a manufacturing base of the wire harness may be set up in a place such as an overseas country or the like away from a delivery location.

However, when the component manufacturer imports the wire harness manufactured overseas from the overseas country into Japan and delivers the imported wire harness to a customer in Japan, it takes about 2 to 3 weeks to import the wire harness, such that the component manufacturer is required to consider a problem of the delivery date of the wire harness to be delivered to the customer.

Here, for example, as disclosed in JP-A-2017-152154, it is assumed that the base harness having basic specifications and one or more optional harnesses of selectable options are combined with each other to form a wire harness of a product. In this case, the base harness can have the common configuration for all vehicle product numbers, such that even before the final number of wire harnesses to be delivered for each product number is confirmed, for example, it is possible to periodically manufacture the number of base harnesses expected to be ordered and to start transportation thereof. Accordingly, it becomes easy to solve the problem of the delivery date and also prevent shortage occurrence.

On the other hand, since there are various types, grades, destinations, or the like of a vehicle on which the wire harness is mounted, the number of wire harnesses to be manufactured for each product number, that is, the types thereof may be several tens of types. Therefore, an optional harness, which is a part excluding the base harness having the basic specifications from the wire harness of the product, is also required to be individually manufactured in quantities confirmed as dozens of types of independent sub-harnesses. It is assumed that, for example, each sub-harness is configured as an intermediate component having a complicated structure formed by bundling and integrating a group of components including several tens of electric wires or the like.

Therefore, when manufacturing of the optional harness starts after the number of wire harnesses for each product number is confirmed, it is difficult to complete the manufacturing of the required number of wire harnesses for each product number within a delivery date of several days. Therefore, it is required to start manufacturing the optional harness before the number of wire harnesses for each product number is confirmed. Therefore, in order to prevent shortage occurrence of the wire harnesses of some product numbers caused by the insufficient number of the manufactured optional harnesses, all the optional harnesses are required to be sufficiently manufactured, which may cause a problem that the number of optional harnesses becoming excess inventory increases and thus manufacturing cost increases.

SUMMARY OF INVENTION

According to an embodiment, a wire harness designing method and a design support device can prevent occurrence of excess inventory of a wire harness and a component that forms a part of the wire harness, and secure the required number of wire harnesses for each product number within a relatively short period of time after the number of wire harnesses for each product number required by a customer is confirmed.

According to an embodiment, a wire harness designing method generates second manufacturing specification information optimized for each wire harness of each product number, based on first manufacturing specification information on a plurality of types of wire harnesses to which each product number is allocated.

The method includes:

extracting, as a primary common component, a component commonly provided in the wire harnesses of all the product numbers from among all components that form the wire harnesses of all the product numbers in the first manufacturing specification information;

determining, by the primary common component, a configuration of a basic part of the wire harness to be manufactured;

classifying, as an optional component, the rest of the primary common component among all the components that form the wire harnesses of all the product numbers;

acquiring information indicating a predicted production quantity for each product number and a usage rate of each component;

extracting, as a secondary common component, a plurality of component groups commonly provided in at least a plurality of product numbers among the optional components of which the usage rate is equal to or higher than a predetermined value among the wire harnesses of the plurality of product numbers extracted based on the predicted production quantity, and determining, by the extracted secondary common component, a configuration of an additional part of the wire harness to be manufactured;

classifying, as an additional component, each component of the rest of secondary common components among the optional components; and forming the whole wire harness of each product number in the second manufacturing specification information with a combination of the wire harness of the basic part, the wire harness of the additional part, and the additional component.

According to an embodiment, a design support device supports work of generating second manufacturing specification information optimized for each wire harness of each product number, based on first manufacturing specification information on a plurality of types of wire harnesses to which each product number is allocated.

The device includes:

a function of classifying, as an optional component, the rest of the primary common component among all the components that form the wire harnesses of all the product numbers in the first manufacturing specification information;

a function of acquiring information indicating a predicted production quantity for each product number and a usage rate of each component;

a function of extracting, as a secondary common component, a plurality of component groups commonly provided in at least a plurality of product numbers among the optional components of which the usage rate is equal to or higher than a predetermined value among the wire harnesses of the plurality of product numbers extracted based on the predicted production quantity, and of determining, by the extracted secondary common component, a configuration of an additional part of the wire harness to be manufactured;

a function of classifying, as an additional component, each component of the rest of secondary common components among the optional components; and a function of forming the whole wire harness of each product number in the second manufacturing specification information with a combination of the wire harness of the basic part, the wire harness of the additional part, and the additional component.

BRIEF DESCRIPTION OF DRAWINGS

FIG. 2 is a flowchart illustrating an example of a procedure for optimizing a configuration of a wire harness when a wire harness designing method of the present invention is performed.

FIG. 3 is a schematic diagram illustrating an example of a display form of a list of optional components for each wire harness product number.

FIG. 6 is a front view illustrating a display example of an additional part configuration, the number of additional components, the total number of components, or the like for each wire harness product number.

DESCRIPTION OF EMBODIMENTS

Figure 1A:
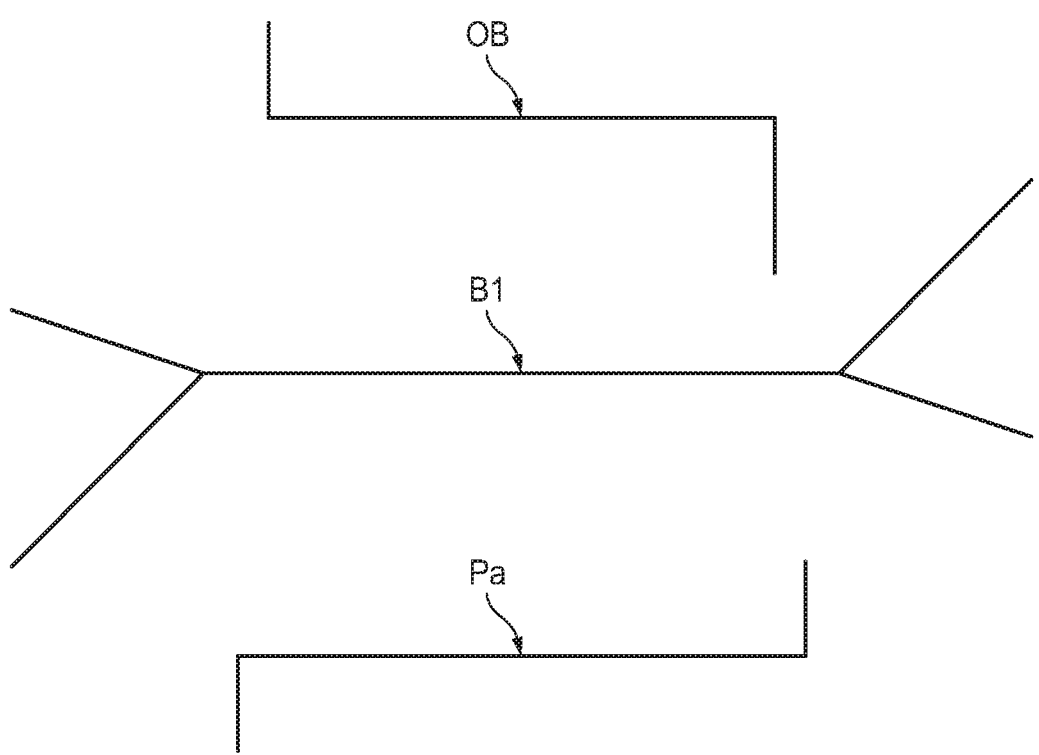
FIG. 1A is a plan view illustrating an example of a combination of wire harness components.
Figure 1B:
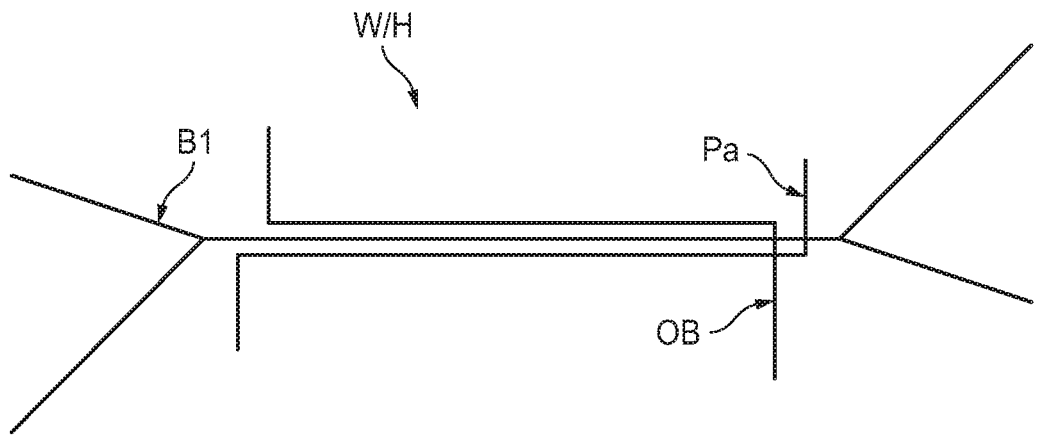
FIG. 1B is a plan view illustrating an example of a manufactured wire harness.

Specific embodiments of the present invention will be described below with reference to the respective drawings.
<Configuration Example of Wire Harness>
An example of a combination of wire harness components is illustrated in FIG. 1A, and an example of a manufactured wire harness W/H is illustrated in FIG. 1B.

For example, when receiving an order for the wire harness from a customer such as an automobile manufacturer or the like, a component manufacturer that manufactures the wire harness W/H receives information representing specifications of the corresponding wire harness, that is, first manufacturing specification information D1. Therefore, the component manufacturer manufactures the wire harness W/H based on the first manufacturing specification information D1 and delivers an ordered quantity by a delivery date.

For example, basically, the wire harness W/H is an assembly of electric circuits that connect one terminal of an electrical component provided on a vehicle to one terminal of another electrical component provided thereon, and is formed by bundling a large number of electric wire groups disposed along a predetermined wiring path. Usually, a terminal for connection is pressed at an end of each electric wire, and the terminal of each electric wire is mounted on a predetermined portion of a predetermined connector. The predetermined portion on an outside of the wire harness is covered with a protective exterior material.

Therefore, in a simplified description, for example, the wire harness W/H becomes a shape as illustrated in FIG. 1B. The automobile manufacturer manufactures various types of vehicles, and these vehicles have respectively different electric circuit configurations and wiring paths depending on a difference in destinations, a difference in grades, or the like. Therefore, it is required to individually manufacture a large number of types of wire harnesses W/H which are respectively managed by a different product number. An allowable period from when the number of wire harnesses W/H to be produced for each product number is confirmed until when the component manufacturer delivers the wire harnesses W/H is very short, for example, about a few days.

Therefore, the component manufacturer is required to manufacture and prepare the required number of wire harnesses W/H for each product number efficiently in a short period of time and without excess or deficiency. It is also necessary to reduce the manufacturing cost. In order to meet the above-described conditions, the component manufacturer devises a manufacturing method of the wire harness W/H, designs the second manufacturing specification information D2 for efficiently manufacturing the wire harness W/H based on the first manufacturing specification information D1, and manufactures the wire harness W/H for each product number according to the designed second manufacturing specification information D2.

When applying the wire harness design method of the present invention, the basic part B1, an additional part OB, and an additional component Pa illustrated in FIG. 1A are respectively manufactured in advance, and are combined with each other to be assembled, thereby manufacturing the wire harness W/H as illustrated in FIG. 1B.

The basic part B1 is a component of a part of the whole wire harness W/H of the product, and indicates a component commonly provided in the wire harnesses of all the product numbers, that is, a sub-harness formed of only a primary common component.

The actual basic part B1 is manufactured as each independent sub-harness for respective systems of a plurality of wiring parts grouped on the automobile. For example, the sub-harnesses of the basic parts B1 respectively connected to a steering wheel system, an engine system, a transmission system, a brake system, or the like are designed and manufactured as intermediate components independent of each other.

The additional part OB is a sub-harness formed of a plurality of components (optional components) forming a remaining component after the configuration of the basic part B1 is excluded from the whole wire harness W/H of each product number. The additional part OB is formed of only an optional component that is commonly provided in the wire harnesses of a plurality of product numbers, that is, a secondary common component. The optional component which becomes a target of the secondary common component is limited to a component that satisfies a specific condition. Specifically, as will be described later, among the components of the wire harnesses of a plurality of product numbers which are predicted to be produced in large quantities, a component of which usage rate is equal to or greater than a predetermined value is selected.

Actually, the sub-harnesses of a plurality of types of additional parts OB are designed and manufactured as intermediate components independent of each other, depending on a situation of an in-vehicle system. Each of the additional parts OB is the intermediate component formed of, for example, several to several tens of electric wires, terminals, connectors, or the like.

The additional component Pa is each remaining component of the optional components, which is not adopted as the secondary common component of any one of the additional parts OB. Each of the additional components Pa is a small-scale component formed of, for example, one to several electric wires, terminals, connectors, or the like.

Therefore, the sub-harness of the basic part B1 (actually, a plurality of sub-harnesses thereof), the sub-harness of one or a plurality of additional parts OB selected according to the product number, and the remaining necessary additional components Pa are assembled as illustrated in FIG. 1B, thereby making it possible to form the wire harness W/H of any product number.

An important fact herein is that the sub-harness of the basic part B1 is formed of only the primary common component, and further, the sub-harness of the additional part OB is formed of only the secondary common component. Therefore, even though the number of wire harnesses W/H for each product number required by the customer fluctuates, there will be no excess or deficiency in the sub-harness of the basic part B1 when a change in the total number of wire harnesses W/H irrelevant to the product number is small. Therefore, even though the manufacturing of the sub-harness of the basic part B1 starts before the number of wire harnesses W/H for each product number required by the customer is confirmed, the problem is unlikely to occur.

The sub-harness of the additional part OB can be assembled to the wire harnesses W/H of a plurality of types of product numbers. Therefore, for example, when the required number of one of the wire harnesses W/H of two types of product numbers that can use the sub-harness of the same additional part OB increases and the required number of the other thereof decreases, the number of required additional parts OB hardly varies, such that the problem of excess or deficiency in manufacturing quantity hardly occurs. Therefore, even though the manufacturing of the sub-harness of the additional part OB starts before the number of wire harnesses W/H for each product number required by the customer is confirmed, the problem hardly occurs.

Particularly, the component of which usage rate is equal to or greater than the predetermined value is preferentially selected as the secondary common component among the components of the wire harnesses of a plurality of product numbers which are predicted to be produced in large quantities, thereby making it possible to increase a possibility that the sub-harness of the additional part OB can be used as the intermediate component common to the wire harnesses of various product numbers, and also to increase the number of common intermediate components. As a result, even though the period from the confirmation of the required number of wire harnesses for each product number to the delivery of those wire harnesses W/H is short, it becomes easy to manufacture the required number of wire harnesses W/H for each product number without excess or deficiency, and an efficient manufacturing step can be implemented.

<Procedure of Optimizing Configuration of Wire Harness>

FIG. 2 illustrates an example of a procedure for optimizing a configuration of the wire harness when the wire harness design method according to the present invention is implemented. That is, the component manufacturer that manufactures the wire harness W/H performs processing illustrated in FIG. 2, thereby making it possible to design the second manufacturing specification information D2 of which configuration is optimized in order to efficiently manufacture the wire harness W/H based on the first manufacturing specification information D1 provided by the customer.

Actually, a designer of the component manufacturer can perform the processing illustrated in FIG. 2 by using a design support device which is not illustrated. In the same manner as that of a general computer system, this design support device can be configured by combining hardware including a central processing unit (CPU), a storage device, an input device, a display, a communication device, or the like, dedicated application software for reading and processing the first manufacturing specification information D1, and special software for implementing characteristic functions of the present invention (each step in FIG. 2). Hereinafter, a processing procedure of FIG. 2 will be described.

For example, in the vehicle manufacturer, a configuration of the electrical system and a wiring path of the wire harness vary depending on a type of vehicle on which the wire harness W/H is mounted, such that it is required to prepare separate wire harnesses W/H having different product numbers and specifications for each type of vehicle before starting the manufacturing of the vehicle.

The design support device installed in the component manufacturer's company communicates with a computer of the vehicle manufacturer which is the customer, thereby acquiring the first manufacturing specification information D1 representing the specifications of the wire harness W/H for each product number (S11). This processing is performed at a timing where sufficient time is left for the delivery date of the corresponding wire harness W/H. Contents of the first manufacturing specification information D1 include design drawing data necessary for manufacturing the target wire harness W/H, specification list information for each product number, and a physical wiring diagram.

The design support device extracts all the components (circuits such as individual electric wires or the like) commonly present in the wire harnesses W/H for all the product numbers as a primary common component Pc1 based on the first manufacturing specification information D1 (S12).

The design support device determines the configuration of the sub-harness of the basic part B1 formed of only a large number of primary common components Pc1 extracted in S12 (S13). In the embodiment, the large number of primary common components Pc1 are divided into 6 types of groups for each vehicle system, and configured as the sub-harnesses of the basic parts B1 respectively independent for each group. For example, a plurality of sub-harnesses of the basic parts B1, which are independent for each group such as for a steering wheel system, for an engine system, for a transmission system, for a brake system, or the like, are generated.

The design support device classifies each remaining component excluding all the primary common components Pc1 extracted in S12 among the components forming the wire harnesses W/H of all the product numbers as an optional component Po (S14).

The design support device acquires a predicted production quantity Np for each product number of the wire harness W/H and a usage rate Ur for each component (S15).

For example, it is assumed that the predicted production quantity Np for each product number thereof is determined to be the same number as the number of vehicles that the vehicle manufacturer plans to produce for each vehicle type before production of the vehicle, or to be the number close thereto. That is, since the same number of wire harnesses W/H as the number of vehicles to be produced for each vehicle type is required, the predicted production quantity Np for each product number of the wire harness W/H is expected to be the same number as the planned number of vehicles to be produced for each vehicle type in the vehicle manufacturer.

The usage rate Ur (Usage rate) for each component can be calculated by the following formula.

$$Ur = (\text{sum of each component usage quantity for each product number})/(\text{total planned number of W/Hs for all the product numbers})$$

The design support device displays a list of components for each product number of the wire harness W/H on a screen in a tabular format (S16). Here, a specific example of contents to be displayed on the screen is illustrated in FIG. 3. The contents will be described later.

With respect to the contents listed on the screen in S16, the design support device updates the display contents by rearranging items (row units) of each product number in descending order of the predicted production quantity Np for each product number (S17).

The design support device updates the display contents by rearranging each component of the contents listed on the screen in descending order of the usage rate Ur (S18).

Figure 4:
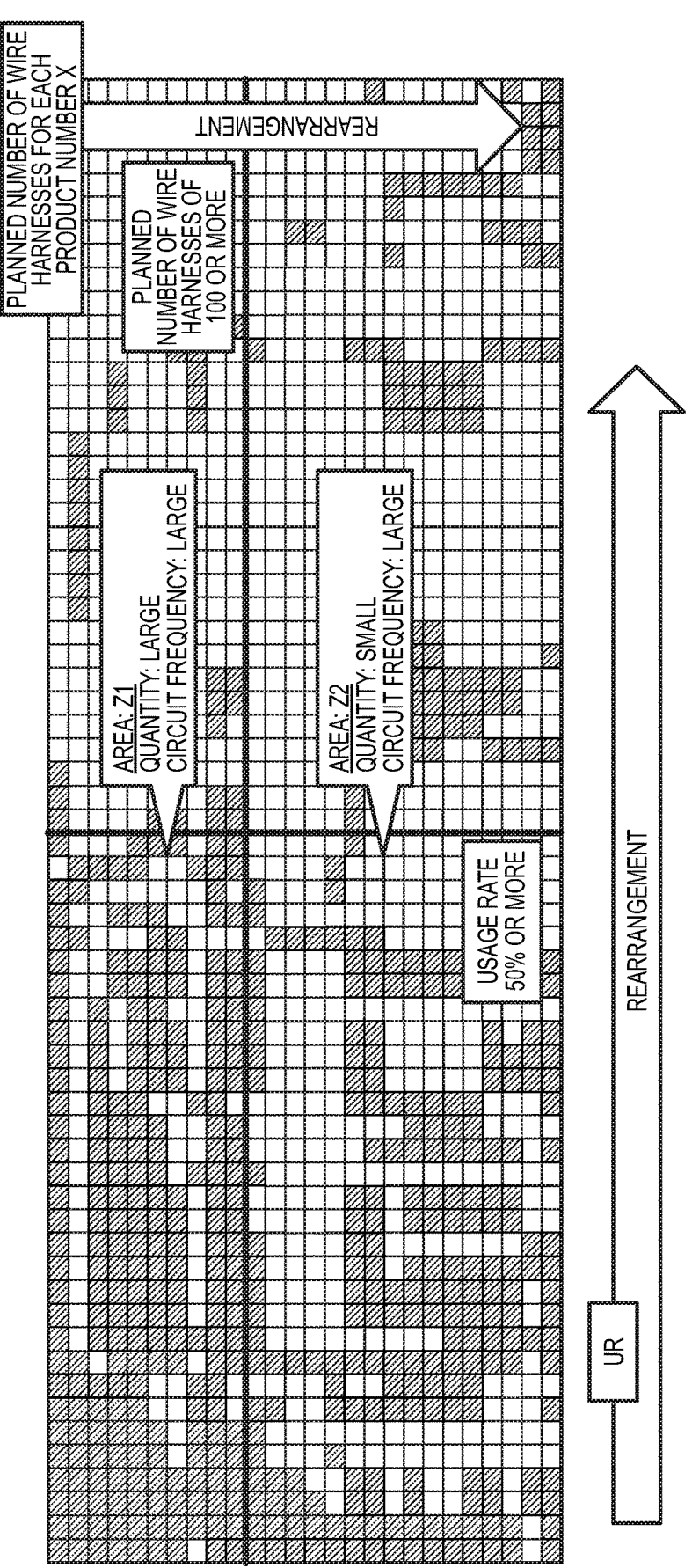
FIG. 4 is a front view illustrating a main part of a screen display example of the list of optional components for each wire harness product number.

FIG. 4 illustrates a specific example of the updated screen after performing step S18. This content will be described later.

The design support device extracts a plurality of secondary common components Pc2 from among a large number of optional components Po displayed on the screen (S19).

The design support device determines the configurations of the sub-harnesses of a plurality of additional parts OB formed of only the secondary common component Pc2 extracted in S19 (S20).

Figure 5:
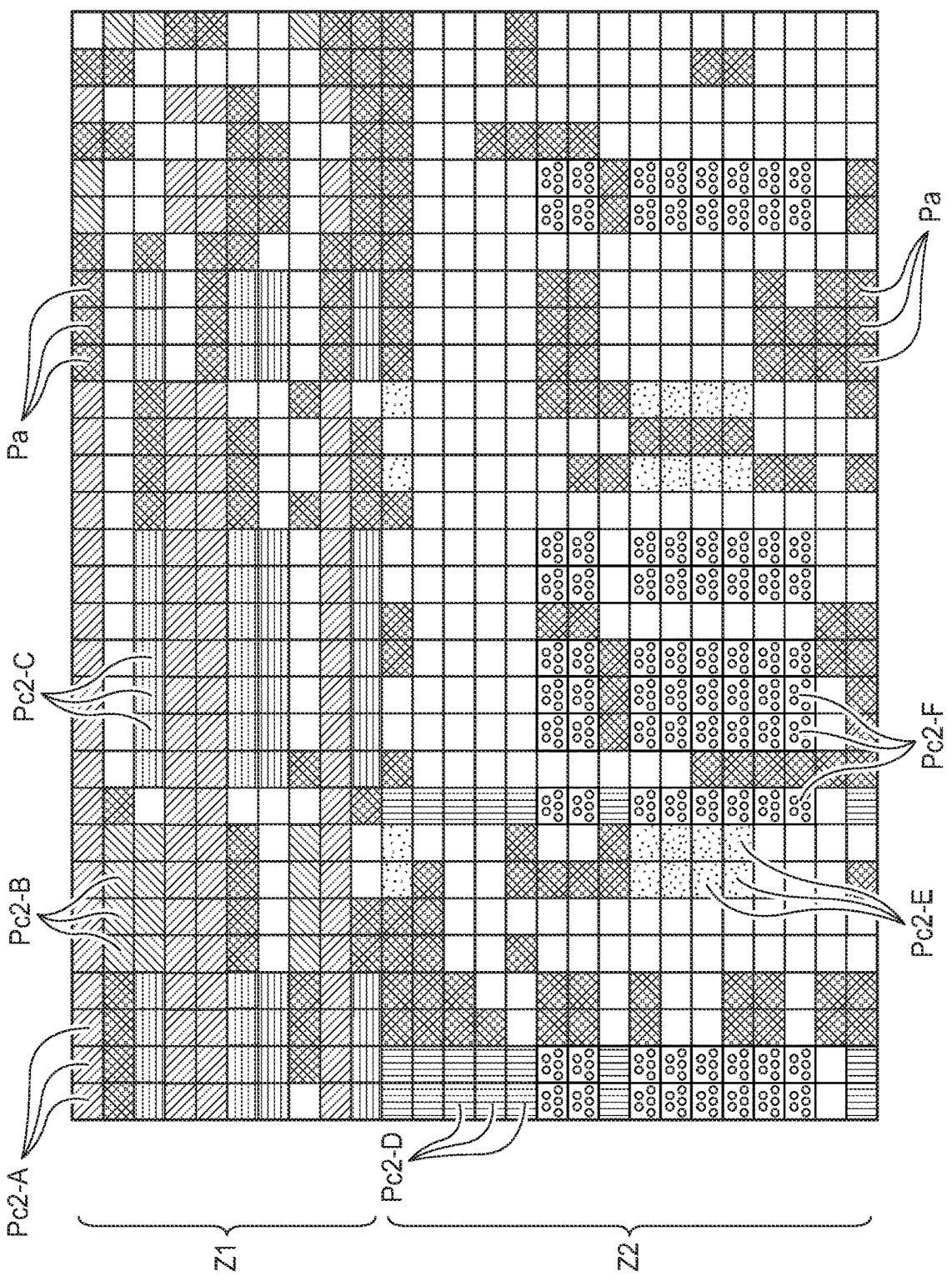
FIG. 5 is a front view illustrating a main part of a screen display example as a result of grouping secondary common components of the optional component.

FIG. 5 illustrates a specific example of the updated screen after performing steps S19 and S20. FIG. 6 illustrates a specific example of a correspondence relationship between the wire harness W/H of each product number and the sub-harness of each additional part OB. The contents thereof will be described later.

With respect to the processing of each step S19 and S20, it is assumed that actually, the designer or the like determines whether or not the optional component Po is an appropriate component based on the contents displayed on the screen and selects the secondary common component Pc2, or determines the configuration of each additional part OB, and gives an instruction to the CPU of the design support device by an input operation such as a keyboard to perform the processing. However, it is also possible to automate the determination made by the designer or the like in S19 and S20 with a predetermined program based on some regularity and various conditions.

The design support device respectively classifies each remaining component among the optional components Po, which is not selected for any one of the secondary common components Pc2, as an additional component Pa (S21).

The design support device determines the contents of the second manufacturing specification information D2 (S22) so that as illustrated in FIG. 1B, the configuration of the wire harness W/H for each product number is a combination of the sub-harness of the basic part B1, the sub-harness of one or a plurality of additional parts OB, and the additional component Pa.

<Display Example of List of Optional Components for Each Product Number>

FIG. 3 illustrates an example of a display mode of a list of optional components Po for each product number of the wire harness W/H.

In the example of FIG. 3, a list of components (corresponding to individual electric wires or the like) forming each of the wire harness product numbers N1, N2, N3, . . . , Nm to be manufactured is arranged in a horizontal direction in each row. For each product number, a component provided in the corresponding wire harness W/H and a component not provided therein are represented by presence or absence of hatching in a rectangular pattern.

For example, in the wire harness W/H of the product number N1, each component of component names A1 and A2 is provided, and each component of component names A3 and A4 is not provided. On the other hand, in the wire harness W/H of the product number N2, each component of the component names A1 and A3 is provided, and each component of the component names A2 and A4 is not provided. The wire harness W/H of each product number also includes a component forming the basic part B1, but in the example of FIG. 3, the component of the basic part B1 is excluded and only the optional component Po is illustrated.

Below each component row, numerical values U1, U2, U3, . . . , Un of the usage rate Ur of the corresponding component (for example, a numerical value of % unit) are illustrated. The usage rate Ur represents a ratio of the total number of used components for each product number to the total planned number of wire harnesses W/H. In FIG. 3, values X1, X2, X3, . . . , Xm of the planned number of wire harnesses for each product number X are arranged on the right side of each wire harness product number N. The sum of the planned number of wire harnesses for each product number X is the total planned number of wire harnesses W/H.

In step S16 illustrated in FIG. 2, a list of optional components Po as illustrated in FIG. 3 can be displayed on the screen in the tabular format. In addition to the optional component Po, a list of each primary common component Pc1 provided in the basic part B1 may be displayed on the same screen at the same time.

Therefore, a user such as a designer who operates the design support device can easily grasp a configuration of components for each wire harness product number N with reference to the screen as illustrated in FIG. 3. The product number N, the usage rate Ur for each component, the planned number of wire harnesses for each product number X, and the like can be grasped.

<Screen Display Example of a List of Optional Components for Each Product Number: After Rearrangement>

FIG. 4 illustrates a screen display example of a list of optional components of the wire harness W/H for each product number. FIG. 4 illustrates a main part on the screen.

From a state of a list of the optional components Po as illustrated in FIG. 3, the design support device rearranges the items in each row from top to bottom in order by row according to the descending order of the predicted production quantity Np for each product number of the wire harness W/H (S17 in FIG. 2). The design support device also rearranges the columns of each optional component Po from a left column to a right column in order by column according to the descending order of the usage rate Ur for each component (S18 in FIG. 2). As a result, the screen as illustrated in FIG. 4 can be displayed.

In FIG. 4, use or non-use of each component for each product number is represented by presence or absence of hatching in each small rectangular pattern.

In FIG. 4, a range of component areas Z1 and Z2 is displayed. The component area Z1 represents a range of a component group whose usage rate Ur for each component is high (for example, a threshold value is 50% or more) among the optional components Po forming the wire harness W/H of the product number whose planned number of wire harnesses for each product number X is large (for example, a threshold value is 100 units or more), and is displayed in a state of being distinguished from others as a rectangular range on an upper left side of the screen.

The component area Z2 represents a range of a component group whose usage rate Ur for each component is large (for example, the threshold value is 50% or more) among the optional component Po forming the wire harness W/H of the product number whose planned number of wire harnesses for each product number X is smaller than that of Z1 (for example, the threshold value is less than 100 units), and is displayed in a state of being distinguished from others as a rectangular range on a lower left side of the screen.

That is, since a large number of blocks of optional components Po are formed within the range of the component areas Z1 and Z2 as illustrated in FIG. 4, it is possible to perform a design which is convenient for manufacturing the wire harness W/H of each product number by devising a configuration of a portion of the blocks. Specifically, when the sub-harness of the additional part OB, which is a collection of the components common to the wire harnesses W/H of a plurality of product numbers among the optional components Po, is configured as a common intermediate component, the number of components of the wire harness W/H including the intermediate component can be significantly reduced. At the same time, since the common intermediate component can be used as any component of the wire harness W/H of a plurality of product numbers, the common intermediate component can be useful for adjusting an increase or decrease in the number of wire harnesses W/H to be produced for each product number. The common intermediate component can also be useful for making it possible to manufacture the required number of wire harnesses W/H for each product number in a short delivery date.

<Screen Display Example as a Result of Grouping Secondary Common Components>

FIG. 5 illustrates a screen display example as a result of grouping the secondary common components Pc2 of the optional component Po. FIG. 5 illustrates a main part on the screen.

In FIG. 5, in the component area Z1 described above, each optional component Po is displayed in a state of being divided into a set of secondary common components Pc2-A, Pc2-B, and Pc2-C divided into three types of groups, and the remaining additional components Pa. On an actual screen that can be viewed by the eyes of the designer, a difference between respective groups of the secondary common components Pc2-A, Pc2-B, and Pc2-C, and a difference from the remaining additional components Pa are displayed as a difference in coloring of a rectangular display pattern.

Here, for example, a set of 23 pieces of respective secondary common components Pc2-A in the 1st to 20th columns and the 25th, 26th, and 28th columns on the left side provided in the wire harness of the product number in the 1st row in FIG. 5 is also provided in the wire harnesses of other product numbers in the 4th, 5th, and 9th rows in the same manner. Therefore, the set of 23 pieces of secondary common components Pc2-A is grouped into one, and allocated as a component that forms the sub-harness of one additional part OB.

Each additional component Pa provided in the wire harness of the product number in the 1st row is allocated to a remaining component obtained by excluding all the secondary common components Pc2-A from among the optional components Po forming the wire harness of this product number.

In the same manner, a set of 5 pieces of respective secondary common components Pc2-B in the 5th to 8th columns and the 30th column provided in the wire harness of the product number in the 2nd row in FIG. 5 is also provided in the wire harnesses of other product numbers in the 3rd and 8th rows in the same manner. Therefore, the set of 5 pieces of secondary common components Pc2-B is grouped into one, and allocated as a component that forms the sub-harness of one additional part OB.

Each additional component Pa provided in the wire harness of the product number in the 2nd row is allocated to a remaining component obtained by excluding the secondary common components Pc2-B from among the optional components Po forming the wire harness of this product number.

In FIG. 5, in the above-described component area Z2, each optional component Po is displayed in a state of being divided into a set of secondary common components Pc2-D, Pc2-E, and Pc2-F divided into three types of groups, and the remaining additional components Pa. On the actual screen, a difference between respective groups of the secondary common components Pc2-D, Pc2-E, and Pc2-F, and a difference from the remaining additional components Pa are displayed as a difference in coloring of a rectangular display pattern.

Here, for example, a set of 3 pieces of respective secondary common components Pc2-D in the 1st, 2nd, and 9th columns on the left side provided in the wire harness of the product number in the 1st row in the area Z2 in FIG. 5 is also provided in the wire harnesses of other product numbers in the 2nd to 5th rows and the 8th and 16th rows in the same manner. Therefore, the set of 3 pieces of secondary common components Pc2-D is grouped into one, and allocated as a sub-harness component of one additional part OB.

In FIG. 5, a set of 4 pieces of respective secondary common components Pc2-E in the 7th, 8th, 18th, and 20th rows in the area Z2 is also provided in the wire harnesses of other product numbers in the 9th to 12th rows. Therefore, the set of 4 pieces of secondary common components Pc2-E is grouped into one, and allocated as a sub-harness component of one additional part OB.

Each additional component Pa provided in the wire harness of the product number of the 1st row in the component area Z2 is allocated to a remaining component obtained by excluding the secondary common components Pc2-D and Pc2-E from among the optional components Po forming the wire harness of this product number.

That is, as illustrated in FIG. 5, by extracting the secondary common component Pc2 commonly provided in the wire harnesses W/H of a plurality of product numbers and performing more appropriate grouping, the configuration of each sub-harness of the plurality of additional parts OB can be determined. By performing the appropriate grouping, the number of components of the wire harness W/H for each product number (the intermediate component is counted as one component) can be reduced, such that it becomes also easy to perform adjustment with respect to a fluctuation in the number of wire harnesses W/H required for each product number.

The work of extracting and grouping the secondary common components Pc as illustrated in FIG. 5 may be actually determined by the judgment of the designer, or may be automatically processed by a program.

<Display Example of Additional Part Configuration, Number of Additional Components, Total Number of Components, or the Like>

FIG. 6 illustrates a display example of an additional part configuration, the number of additional components, the total number of components, or the like for each product number of the wire harness W/H.

In the example of FIG. 6, a combination of the additional parts OB-A to OB-F formed of the secondary common components Pc2-A to Pc2-F of the six groups illustrated in FIG. 5, the additional number of additional components Pa, and the total number of components NT are displayed in a list for each product number of the wire harness W/H.

In FIG. 6, for example, the wire harness W/H of the product number (KB111) shown in the 1st row is formed of the sub-harness of one additional part OB-A and 10 pieces of additional components Pa, such that the total number of components NT is 11 (1+10). Actually, this optional component and the basic part B1 are combined to form the wire harness W/H of one product number.

For example, the wire harness W/H of the product number (HZ423) shown in the 3rd row is formed of the sub-harnesses of two types of additional parts OB-B and OB-C and 11 pieces of additional components Pa, such that the total number of components NT is 13 (2+11).

Each additional component Pa is a small-scale component formed of about one to several electric wires. The number of electric wires provided in each of the additional parts OB-A to OB-F is about several to several tens. As illustrated in FIG. 6, by appropriately grouping respective secondary common components Pc2 forming respective additional parts OB-A to OB-F, the number of additional components forming the whole wire harness W/H can be reduced by, for example, about half.

That is, since the configuration of the basic part B1 is irrelevant to the product number, the manufacturing of the basic part B1 can be started at a stage where the planned production quantity of the whole vehicle is almost confirmed, even before the number of wire harnesses W/H for each product number required by the customer is confirmed. Since the configurations of the respective additional parts OB-A to OB-F are common to a plurality of product numbers, the additional parts OB-A to OB-F having the common configuration can be flexibly adjusted among the plurality of product numbers, with respect to the increase or decrease in the required number of wire harnesses W/H for each product number. Therefore, the manufacturing of the sub-harnesses of the respective additional parts OB-A to OB-F can also be started before the production quantity for each product number is confirmed.

The manufacturing of the sub-harness of the basic part B1 which is a component of the wire harness W/H can be started at a sufficiently early timing with respect to the delivery date of the wire harness W/H to the customer. Therefore, the basic part B1 can be manufactured and transported over a long distance by using a base located far away from the delivery location, such as an overseas production base or the like, and can be used as a component of the wire harness W/H. The manufacturing of the sub-harness of each additional part OB can be started by using a base close to the delivery destination, such as a domestic manufacturing base or the like, even before the number of wire harnesses W/H for each product number required by the customer is confirmed. The manufacturing of the minimum number of respective additional components Pa may be started before the actual required quantity is confirmed by anticipating the expected fluctuation in the number of wire harnesses W/H for each product number required by the customer.

According to an embodiment, a wire harness designing method generates second manufacturing specification information (second manufacturing specification information D2) optimized for each wire harness of each product number, based on first manufacturing specification information (first manufacturing specification information D1) on a plurality of types of wire harnesses (W/H) to which each product number is allocated.

The method includes:

extracting, as a primary common component (Pc1), a component commonly provided in the wire harnesses of all the product numbers from among all components that form the wire harnesses of all the product numbers in the first manufacturing specification information, and determining, by the primary common component, a configuration of a basic part (B1) of the wire harness to be manufactured (S12 and S13);

classifying, as an optional component (Po), the rest of the primary common component among all the components that form the wire harnesses of all the product numbers (S14);

acquiring information indicating a predicted production quantity (Np) for each product number (N) and a usage rate (Ur) of each component (S15);

extracting, as a secondary common component (Pc2), a plurality of component groups commonly provided in at least a plurality of product numbers among the optional components of which the usage rate is equal to or higher than a predetermined value among the wire harnesses of the plurality of product numbers extracted based on the predicted production quantity, and determining, by the extracted secondary common component, a configuration of an additional part (OB) of the wire harness to be manufactured (S19 and S20);

classifying, as an additional component (Pa), each component of the rest of secondary common components among the optional components (S21); and forming the whole wire harness of each product number in the second manufacturing specification information with a combination of the wire harness of the basic part, the wire harness of the additional part, and the additional component (S22).

According to the wire harness designing method having the above configuration, since the whole wire harness of each product number is formed with the combination of the wire harness of the basic part, the wire harness of the additional part, and the additional component, it becomes easy to adjust a manufacturing process according to a quantity fluctuation for each product number of the wire harness required by a customer, such that occurrence of excess inventory can be prevented. That is, since each of the wire harness of the basic part and the wire harness of the additional part is formed with the primary common component or the secondary common component, each of the wire harness of the basic part and the wire harness of the additional part can be used in common for any one of the wire harnesses of a plurality of product numbers. Therefore, for example, since the additional part, which becomes excess inventory because of reduced required quantity of wire harnesses for one product number, can be diverted as it is as a component of the wire harness of another product number of which required quantity increases, the excess inventory quantity of the additional part can be prevented. Since the secondary common component is extracted from among the optional components of which the usage rate is equal to or higher than the predetermined value among the wire harnesses of the plurality of product numbers extracted based on the predicted production quantity, there is a high possibility that the wire harness of the additional part (the intermediate component) can be diverted to a wire harness other than the planned product number, such that the wire harness is unlikely to become the excess inventory. The wire harness of the basic part and the wire harness of the additional part can start to be manufactured before the production quantity of the wire harness for each product number is confirmed. Therefore, it is possible to shorten a required period from confirmation of a production quantity of the wire harness to delivery of the wire harness of the production quantity. Particularly, since the secondary common component is extracted from among the components of the product number of which predicted production quantity is large and usage rate is high, larger number of secondary common components can be manufactured before the actually required quantity is confirmed.

In the wire harness designing method, the basic part (B1) of the wire harness to be manufactured and each primary common component (Pc1) may be classified into a plurality of groups according to system classification of a wiring target part (S13).

According to the wire harness designing method having the above configuration, a plurality of electrical components located close to each other or concentrated on a vehicle can be connected to each other by the basic parts of groups that are independent of each other. Therefore, it becomes easy to optimize a configuration so that a length of each electric wire provided in the basic part of each group is shortened.

In the wire harness designing method, the plurality of product numbers and the combination of components which are components for each product number may be displayed in a tabular format (S16), and when the information indicating the predicted production quantity for each product number and the usage rate of each component is acquired, the product numbers may be rearranged in the order of the predicted production quantity, and the optional components may be rearranged and displayed in the order of the usage rate (S17 and S18).

According to the wire harness designing method having the above configuration, a designer who intends to optimize the configuration of the wire harness in the second manufacturing specification information can easily and correctly grasp the configuration of each part before and after the optimization based on displayed contents. Particularly, since the product numbers are rearranged in the order of the predicted production quantity, and the optional components are rearranged and displayed in the order of the usage rate, the designer can easily grasp a component to be preferentially extracted as the secondary common component.

According to an embodiment, a design support device supports work of generating second manufacturing specification information optimized for each wire harness of each product number, based on first manufacturing specification information on a plurality of types of wire harnesses to which each product number is allocated. The device includes:

a function of classifying, as an optional component, the rest of the primary common component among all the components that form the wire harnesses of all the product numbers in the first manufacturing specification information (S14);

a function of acquiring information indicating a predicted production quantity for each product number and a usage rate of each component (S15);

a function of extracting, as a secondary common component, a plurality of component groups commonly provided in at least a plurality of product numbers among the optional components of which the usage rate is equal to or higher than a predetermined value among the wire harnesses of the plurality of product numbers extracted based on the predicted production quantity, and of determining, by the extracted secondary common component, a configuration of an additional part of the wire harness to be manufactured (S19 and S20);

a function of classifying, as an additional component, each component of the rest of secondary common components among the optional components (S21); and a function of forming the whole wire harness of each product number in the second manufacturing specification information with a combination of the wire harness of the basic part, the wire harness of the additional part, and the additional component (S22).

According to the design support device having the above configuration, since the whole wire harness of each product number is formed with the combination of the wire harness of the basic part, the wire harness of the additional part, and the additional component, it becomes easy to adjust a manufacturing process according to a quantity fluctuation for each product number of the wire harness required by the customer, such that occurrence of excess inventory can be prevented. Since the secondary common component is extracted from among the optional components of which the usage rate is equal to or higher than the predetermined value among the wire harnesses of the plurality of product numbers extracted based on the predicted production quantity, there is a high possibility that the wire harness of the additional part (the intermediate component) can be diverted to a wire harness other than the planned product number, such that the wire harness is unlikely to become the excess inventory. The wire harness of the basic part and the wire harness of the additional part can start to be manufactured before the production quantity of the wire harness for each product number is confirmed. Therefore, it is possible to shorten a required period from confirmation of a production quantity of the wire harness to delivery of the wire harness of the production quantity. Particularly, since the secondary common component is extracted from the components of the product number of which predicted production quantity is large and usage rate is high, larger number of secondary common components can be manufactured before the actually required number of secondary common components is confirmed.

The design support device may further include:

a function of displaying the plurality of product numbers and the combination of components which are components for each product number in a tabular format (S16); and a function of rearranging the product numbers in the order of the predicted production quantity, and of rearranging and displaying the optional components in the order of the usage rate, based on the information indicating the predicted production quantity for each product number and the usage rate of each component (S17 and S18).

According to the design support device having the above configuration, a designer who intends to optimize the configuration of the wire harness in the second manufacturing specification information can easily and correctly grasp the configuration of each part before and after the optimization based on displayed contents. Particularly, since the product numbers are rearranged in the order of the predicted production quantity, and the optional components are rearranged and displayed in the order of the usage rate, the designer can easily grasp a component to be preferentially extracted as the secondary common component.

With the wire harness designing method and the design support device of the present invention, it is possible to prevent occurrence of excess inventory of a wire harness and a component that forms a part of the wire harness. It is also possible to deliver the required number of wire harnesses for each product number within a relatively short period of time after the number of wire harnesses for each product number required by a customer is confirmed.

What is claimed is:

1. A design support device for supporting work of generating second manufacturing specification information optimized for each wire harness of each product number, based on first manufacturing specification information on a plurality of types of wire harnesses to which each product number is allocated, the device comprising:

a memory storing instructions; and one or more processors configured to execute the instructions to implement:

a function of extracting, as a primary common component, a component commonly provided in the wire harnesses of all the product numbers from among all components that form parts of the wire harnesses of all the product numbers in the first manufacturing specification information;

a function of determining, by the primary common component, a configuration of a basic part of the wire harness to be manufactured;

a function of classifying and outputting a user interface displaying, as an optional components from among the components that form the parts of the wire harnesses of all the product numbers, the rest of the primary common component among all the components that form the parts of the wire harnesses of all the product numbers;

a function of acquiring information indicating a predicted production quantity for each product number and a usage rate of each component;

a function of extracting, as a secondary common component, and outputting, to the user interface and as a rearrangement of a display of the optional components by the user interface, a plurality of component groups commonly provided in at least a plurality of product numbers among the optional components of which the usage rate is equal to or higher than a predetermined value among the wire harnesses of the plurality of product numbers extracted based on the predicted production quantity, and of determining, by the extracted secondary common component, a configuration of an additional part of the wire harness to be manufactured, wherein the plurality of component groups are of the optional components which are classified from among the components that form the parts of the wire harnesses of all the product numbers;

a function of classifying, as an additional component, each component of the rest of secondary common components among the optional components; and a function of forming the whole wire harness of each product number in the second manufacturing specification information with a combination of the wire harness of the basic part, the wire harness of the additional part, and the additional component.

2. The design support device according to claim 1, wherein the basic part of the wire harness to be manufactured and each primary common component are classified into a plurality of groups according to system classification of a wiring target part.

3. The design support device according to claim 1, wherein the plurality of product numbers and the combination of components which are components for each product number are displayed in a tabular format, and when the information indicating the predicted production quantity for each product number and the usage rate of each component is acquired, the product numbers are rearranged in the order of the predicted production quantity, and the optional components are rearranged and displayed in the order of the usage rate.

4. The design support device according to claim 1, further comprising:

a function of displaying the plurality of product numbers and the combination of components which are components for each product number in a tabular format; and a function of rearranging the product numbers in the order of the predicted production quantity, and of rearranging and displaying the optional components in the order of the usage rate, based on the information indicating the predicted production quantity for each product number and the usage rate of each component.

5. The design support device according to claim 1, wherein the rearrangement of the display of the optional components by the user interface comprises outputting the display as a grid representing the components that form the parts of the wire harnesses of all the product numbers, and wherein by the rearrangement, the grid comprises a first axis and a second axis wherein, along the first axis, the components are sorted by the usage rate and, along the second axis, by a number of harnesses planned to be produced for each of the product numbers.

\*  \*  \*  \*  \*